Oct. 11, 1927.  
F. HAMACHEK  
1,645,324  
SEPARATING APRON FOR GREEN PEA VINE HULLERS  
Filed Jan. 11. 1924  
2 Sheets-Sheet 1
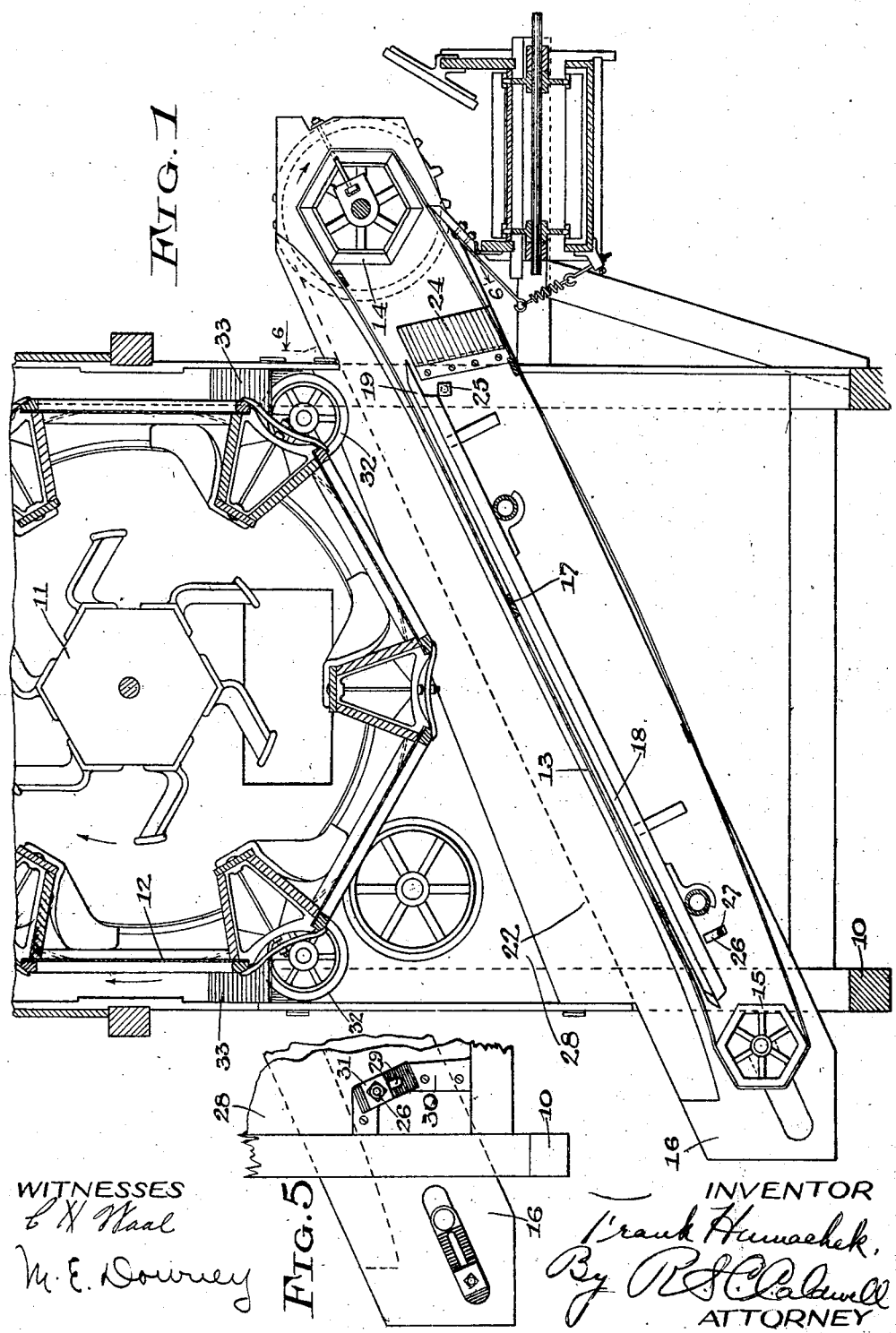
WITNESSES  
INVENTOR  
Frank Hamachek,  
By R. S. Caldwell  
ATTORNEY Oct. 11, 1927.  F. HAMACHEK  1,645,324
SEPARATING APRON FOR GREEN PEA VINE HULLERS
Filed Jan. 11, 1924   2 Sheets-Sheet 2
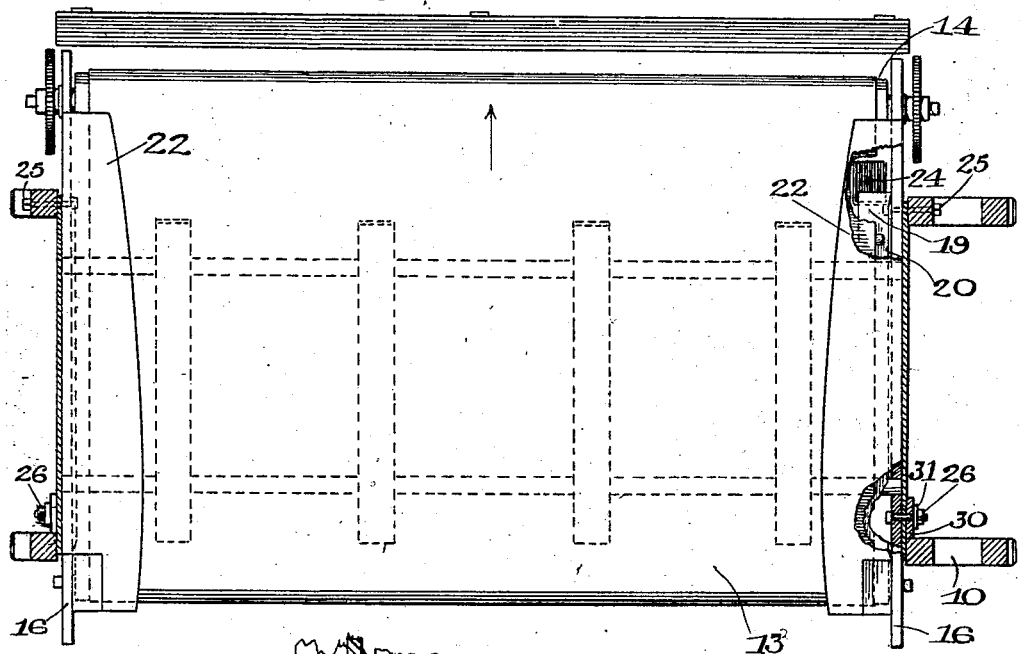
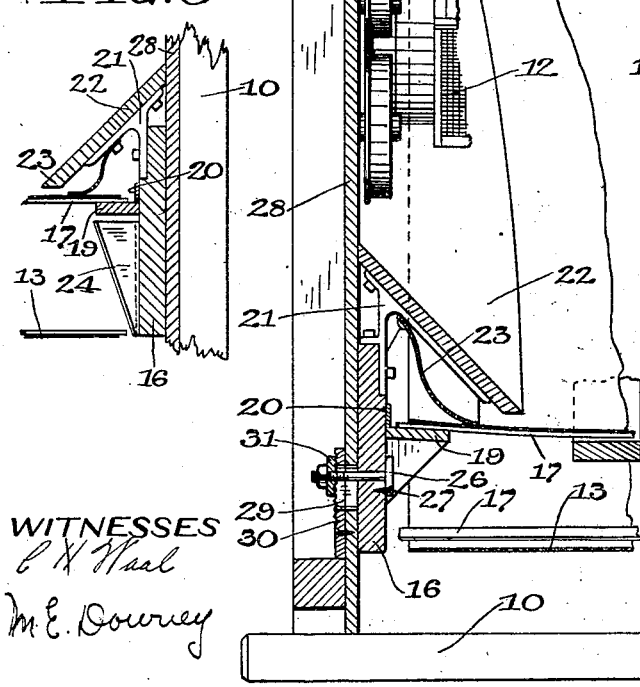
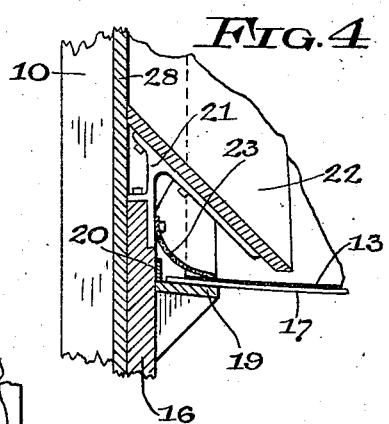
WITNESSES
INVENTOR
Frank Hamachek
ATTORNEY Patented Oct. 11, 1927.

1,645,324

UNITED STATES PATENT OFFICE.

FRANK HAMACHEK, OF KEWAUNEE, WISCONSIN, ASSIGNOR TO FRANK HAMACHEK MACHINE COMPANY, OF KEWAUNEE, WISCONSIN, A CORPORATION OF WISCONSIN.

SEPARATING APRON FOR GREEN-PEA-VINE HULLERS.

Application filed January 11, 1924. Serial No. 685,652.

This invention has for its object to improve the construction of green pea vine hullers in such a manner as to increase the life of the separating apron by protecting it from wear and by providing it with adjustments which may check the destructive tendency of the apron to creep to one side.

Another object of the invention is to provide a separating apron for green pea vine hullers with adjustments whereby its incline may be changed to adapt it for lima beans and other crops.

Another object of the invention is to improve the sanitary conditions by guarding against the crushing of peas and by providing for quick disposal of crushed peas and dirt so that they will not tend to gather on the separating apron or other parts.

With the above and other objects in view the invention consists in the separating apron for green pea vine hulling machines as herein claimed and all equivalents.

Referring to the accompanying drawings, in which like characters of reference indicate the same parts in different views, Fig. 1 is a transverse sectional view of a green pea vine hulling machine equipped with a separating apron constructed in accordance with this invention;

Fig. 2 is a plan view of the separating apron;

Fig. 3 is a vertical sectional view at one side of the conveyer showing the adjusting means therefor;

Fig. 4 is a similar view showing a modified form of flap;

Fig. 5 is a side view of the lower end of the conveyer showing its adjusting means, and Fig. 6 is a sectional detail view showing the discharge chute for material that finds its way to the edge of the apron.

In these drawings, 10 indicates the frame, in which is mounted a beater drum 11 surrounded by a screen drum 12 as usual for effecting the opening of peas and their separation from the vines and pods. Beneath the screen drum is an inclined separating apron 13 traveling upwardly around polygonally shaped rollers 14 and 15 carried by a conveyer frame 16. The loose peas and chaff falling through the openings of the screen drum land on the ascending separating apron, the inclination of which is such as to cause the spherical peas to roll down while the dirt and chaff follow along with the apron in its upward travel, thus effecting their separation. The jerking motion given to the apron by the angular shapes of the rollers 14 and 15 prevents the peas from lodging on the apron and being carried along with the dirt and chaff and keeps them in motion so that they will roll down freely.

The apron is provided at intervals with cross slats 17 to keep it extended because its width is equal to the length of the screen drum, about thirteen feet. These slats also tend to give support to the upper bight of the apron for they ride on guides 18 supported by the conveyer frame and their ends slide along shelves 19, six or seven inches wide, mounted on brackets on the side members of the conveyer frame 16. These slats 17 project beyond the edge of the apron where they can engage wear strips 20, preferably of hardwood, should the apron tend to creep to the side.

Mounted on the side members of the conveyer frame by means of brackets 21 are inclined guard boards 22 which deflect the falling peas and chaff away from the edge of the apron and, in order that the material sliding off of the edge of the guide board should not be deposited on the apron in a single line of deposit which would cause the apron to wear excessively at that place, the two guard boards 22 are divergent, spreading farther apart at the upper end of the apron, thus distributing the material deposited therefrom over a broad area of the apron surface. The guard boards do not touch the apron, but clear it sufficiently to prevent the jerking movements of the apron bringing it in contact therewith and so avoid wear that would otherwise occur, and to prevent peas from rolling over the edge of the apron an inclined flexible flap 23 is secured to the bottom of each guard board, as shown in Fig. 3, or to the conveyer frame, as shown in Fig. 4, and rests lightly on the surface of the apron.

While the presence of the flaps 23 tends to prevent peas and dirt reaching the edge of the apron, further precaution is necessary or desirable to prevent peas and dirt from reaching the interior surface of the apron, where they will tend to build up a mass of plastic matter on the rollers, which will harden and distort the apron, causing it to run unevenly and tending to the destruction of the apron. For this reason the shelves 19 are made as nearly horizontal as possible, only allowing for the natural sag of the apron, and peas and dirt which find their way to the edge of the apron despite the guards and flaps will be carried along the shelves 19 by means of the slats 17 scraping the upper surface of the shelves and until they reach the end of the shelves where they are scraped into an inclined metal chute 24, by which they are conducted away from the apron, as shown in Fig. 6.

Because of the great width of the separating apron, it is difficult to cause it to run true without a tendency to creep to one side or the other, and it is found that by raising the side toward which it creeps the tendency may be checked and for this reason each of the side members 16 of the conveyer frame is made independently adjustable. Near its upper end it is fulcrumed on a bolt 25 to the frame 10 and near its lower end it is provided with a T-headed bolt 26 having a wood screw 27 passed through one end of its head to prevent it from turning. This bolt extends through a slot in the sheathing 28, which forms a casing on the frame surrounding the parts, and through a slot 29 in a metal plate 30 rigidly fixed at the corner of the frame. A toothed washer 31 on the bolt 26 engages a toothed surface of the plate 30 and serves to lock the conveyer frame side member in any pivotal adjustment. By loosening the nut of bolt 26 the side member of the conveyer frame may be raised or lowered to the desired position at which the apron will not creep and then this warped position of the frame is retained by tightening the nut. Furthermore, this adjustment at each side member of the conveyer frame permits of the angularity of the inclined conveyer apron being changed to suit different conditions. In separating such crops as lima beans a greater inclination of the separating apron is required in order to cause the irregularly shaped beans to roll down and this may be accomplished by the adjusting means provided.

To further prevent the bruising of peas and the lodgment of bruised peas which may produce unsanitary conditions and in order to avoid the use of an enclosure for the idle rollers 32 which support the screen drum 12, inclined guards 33 are provided over said idle rollers to deflect falling material away therefrom and so prevent peas being crushed thereby, and they are mounted on the housing 28 with such an inclination as to shed the material, thus making them self-cleaning.

By means of this invention a material advance has been made in the avoidance of the crushing of peas by the mechanism within the housing and in the avoidance of the possibility of crushed peas becoming lodged where they may sour and develop bacteria or fungus growths to be later communicated to the pack when they are dislodged. The machine is made self-cleaning to a greater extent than before and particularly is this true with respect to the separating apron, the slats of which constantly scrape the supporting shelves free from any dirt and peas that may find their way to the edge of the apron and the scrapings are safely conducted away from the apron so that there can be no accumulation on the under side of the apron tending to distort it and cause it to become rapidly worn out.

With this invention also the life of the separating apron is greatly increased because of the provision made for adjusting the elevation of either end of its lower roller independently while the machine is made adaptable for different crops by changing the incline of the apron.

What I claim as new and desire to secure by Letters Patent is:

1. In a green pea vine hulling machine, an inclined separating apron comprising in combination with the machine frame, inclined side frame members pivotally mounted thereon near their upper ends and independently adjustably connected therewith at their lower ends, drums mounted across the upper and lower ends of the side frame members, a separating apron passing around the drums, slats secured to the inner face of the apron and extending beyond the edges thereof, and shelves carried by the side frames with the ends of the slats bearing thereon, the independent adjustment of the lower ends of the side frames permitting a warping of the conveyer to prevent the apron from creeping.

2. In a green pea vine hulling machine, a separating apron comprising in combination with the machine frame of side frames inside the machine frame and pivotally mounted thereon at one side of the machine and vertically adjustably mounted at the other side of the machine, rollers mounted on the side frames at the two sides of the machine, one roller being at a greater elevation than the other, a conveyer belt passing around the rollers, and guides for the edges of the conveyer belt mounted on the side frames to remain in their guiding relation with the belt in all adjustments of the side frames.

3. In a green pea vine hulling machine, a separating apron comprising in combination with the machine frame of side frames pivotally mounted thereon at one side of the machine, an inclined conveyer apron supported between the side frames, and means for adjustably warping the apron to check a tendency of the apron to creep to one side consisting of means for independently adjusting vertically either side frame on its pivotal connection.

4. In a green pea vine hulling machine, an inclined separating apron comprising in combination with the main frame, side frames pivotally mounted thereon at one side of the machine and adjustably mounted thereon at the other side of the machine, drums mounted on the side frames at both sides of the machine, an apron passing around the drums, slats secured to the inner face of the apron and extending beyond the edges thereof, shelves mounted on the side frames and forming guides on which the ends of the slats bear, and an inclined guard on each side frame overhanging the edge of the apron.

5. In a green pea vine hulling machine, an inclined separating apron comprising in combination with the main frame, side frames pivotally mounted thereon at one side of the machine and adjustably mounted thereon at the other side of the machine, drums mounted on the side frames at both sides of the machine, an apron passing around the drums, slats secured to the inner face of the apron and extending beyond the edges thereof, shelves mounted on the side frames and forming guides on which the ends of the slats bear, an inclined guard on each side frame overhanging the edge of the apron, and a flexible flap mounted beneath the guard and bearing on the apron near the edge thereof.

6. In a green pea vine hulling machine, a separating conveyer comprising an inclined apron, slats on the under surface thereof, guide shelves on which the slats slide for scraping along the shelves material which may pass over the edge of the apron, and chutes at the ends of the guide shelves to receive the material scraped therefrom and to conduct it away from the apron.

7. In a green pea vine huller, a separating conveyer comprising in combination with the frame of the machine side frames pivotally mounted thereon at one side of the machine and adjustably mounted thereon at the other side of the machine, rollers mounted on the side frames, an inclined apron passing around the rollers, slats extending across the inner surface of the apron, guide shelves secured to the side frames and having the slats slide thereon to scrape along the shelves material which may pass over the edges of the apron, and chutes on the side frames at the ends of the shelves to receive the material therefrom and to conduct it away from the apron.

8. In a green pea vine hulling machine, a separating apron comprising a frame including rollers, an apron passing around the rollers and forming an inclined conveyor apron, and means for checking the tendency of the apron to creep to one side comprising means for warping the frame.

9. In a green pea vine hulling machine, a frame, a housing thereon, side frames pivotally mounted within the housing, rollers mounted on the side frames, an inclined apron passing around the rollers, and means for directing the travel of the apron by warping its support by adjusting the side frames on their pivotal connections comprising bolts secured to the side frames and passing through slots in the housing, toothed plates on the housing having slots through which the bolts pass, toothed clamping members on the bolts for engaging the teeth of the plates, and nuts threaded on the bolts for securing the clamping members in toothed engagement with the teeth of the plates.

10. In a green pea vine hulling machine, an inclined separating apron comprising in combination with the machine frame, inclined side frame members inside the machine frame and pivotally mounted thereon near their upper ends, drums mounted across the upper and lower ends of the side frame members, a separating apron passing around the drums, slats secured to the inner face of the apron and extending beyond the edges thereof, shelves mounted on the side frames with the ends of the slats bearing thereon, and means for preventing the apron from creeping adapted to warp the conveyer by independent adjustment by the lower ends of the side frames.

In testimony whereof, I affix my signature.

FRANK HAMACHEK.